United States Patent [19]
Denning

[11] 4,249,429
[45] Feb. 10, 1981

[54] UNLOCKING DIFFERENTIAL

[75] Inventor: Ralph E. Denning, Washington, Ill.

[73] Assignee: Caterpillar Tractor Co., Peoria, Ill.

[21] Appl. No.: 939,751

[22] Filed: Sep. 5, 1978

[51] Int. Cl.³ .................................... F16H 1/44
[52] U.S. Cl. ................................ 74/711; 74/710.5
[58] Field of Search ............................ 74/711, 710.5

[56] References Cited

U.S. PATENT DOCUMENTS

| | | | |
|---|---|---|---|
| 2,778,246 | 1/1957 | Thornton | 74/711 |
| 2,830,466 | 4/1958 | Myers | 74/650 |
| 2,947,200 | 8/1960 | Stump | 74/710.5 X |
| 3,027,781 | 4/1962 | O'Brien | 74/711 |
| 3,229,550 | 1/1966 | Nickell | 74/711 |
| 3,442,154 | 5/1969 | Kotoucek | 74/710.5 |
| 3,452,619 | 7/1969 | Roper | 74/711 |
| 3,587,346 | 6/1971 | Takahashi et al. | 74/710.5 |
| 3,605,523 | 9/1971 | O'Brien | 74/711 |
| 3,648,545 | 3/1972 | Clancey | 74/710.5 |
| 3,762,241 | 10/1973 | Roper | 74/711 |
| 3,811,341 | 5/1974 | Goscenski, Jr. | 74/711 |
| 4,077,279 | 3/1978 | Gosenski, Jr. | 74/711 |

FOREIGN PATENT DOCUMENTS

| | | | |
|---|---|---|---|
| 1220265 | 6/1966 | Fed. Rep. of Germany | 74/711 |
| 1505737 | 11/1970 | Fed. Rep. of Germany | 74/710.5 |
| 2324528 | 11/1973 | Fed. Rep. of Germany | 74/710.5 |
| 2549408 | 6/1976 | Fed. Rep. of Germany | 74/710.5 |

*Primary Examiner*—Leslie Braun
*Attorney, Agent, or Firm*—Wegner, Stellman, McCord, Wiles & Wood

[57] ABSTRACT

A differential (10) having differential gears (56,58) connecting a pair of axles (44,46) includes a pair of opposed cam rings (66,68) mounted for rotation with one of the axles. One cam ring (66) is adapted to lock the axles (44,46) relative to the differential housing (12) when no differential rotation exists between the axles (44,46) and is movable when differential rotation does exist by the interaction between the cam rings (66,68) to an inoperative position to unlock the axles from the housing. A lockout ring (70) maintains the cam rings (66,68) in disengaged relation during differential rotation.

7 Claims, 6 Drawing Figures

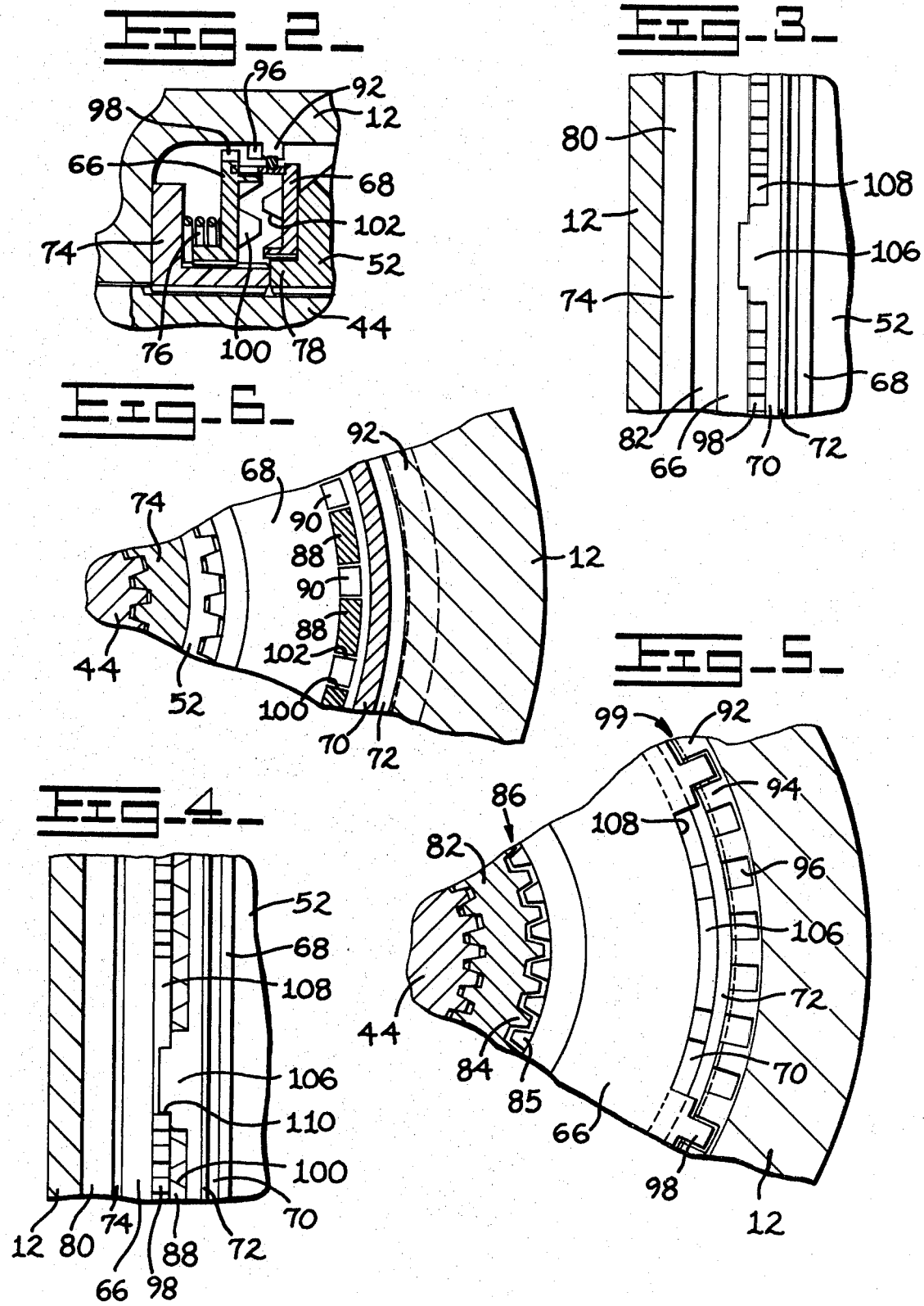

UNLOCKING DIFFERENTIAL

TECHNICAL FIELD

This invention relates to a differential and, morparticularly, to an unlocking differential for a vehicle that acts as a solid axle during straight ahead motion and as a standard differential during a turn to provide equal torque to each axle.

BACKGROUND ART

In the prior art, differentials which allow one axle to turn faster than the other are well-known. During a turn, the differential will permit one wheel to turn at a velocity different from the other. When the turn is completed, the axles rotate at the same velocity.

Presently in use are standard differentials, torque biasing differentials and overrunning clutches. In a standard differential, axle torques are equal and are limited by the wheel having the lesser tractive effort. Hence, if one wheel slips or spins, torque applied to the other wheel is reduced. The differential housing will thus rotate at the mean velocity of both wheels. A standard differential offers no resistance to steering. A torque biasing differential provides greater torque to the slower turning axle, which may be a fixed amount of torque transfer or an amount proportional to input torque magnitude. The torque transfer also occurs during turns so that the inner or slower turning wheel receives the greater torque. This produces a resistance to steering. In a torque biasing differential, the inner wheel, if it has poor traction, is forced to spin. An overrunning clutch can provide unlimited torque biasing during straight ahead operation, but transfers all torque to the inner wheel during a turn, while the outer wheel receives no torque. As a result, there is a high resistance to steering.

DISCLOSURE OF INVENTION

The present invention is directed to overcoming one or more of the problems as set forth above.

In one aspect of the present invention, the axles are connected to a differential housing by differential gears and cam means are used to lock the axles to the housing under normal operation and to unlock the differential gears when a prescribed or preset difference in axle torques is encountered.

In accordance with the present invention, the cam means includes a pair of opposed cams mounted to one of the axles and movable between engaged and disengaged positions whereby relative rotation between the differential housing and the axles causes the cams to move from their engaged position locking the axles to the housing to their disengaged position wherein the axles are free to rotate relative to the housing. A lockout ring in frictional relation to the housing maintains the cams in spaced relation when they are in their disengaged position. The lockout ring acts against the force of a biasing spring, which urges the cams toward engaged locked position, until a torque reversal occurs. Thereafter, the lockout ring permits the cams to reengage to lock the axles to the differential housing.

Thus, the differential herein acts as a solid axle during straight line operation of the vehicle, but acts as a standard differential to provide equal torque to each axle during a turn so as to eliminate steering resistance and forced wheel spin.

BRIEF DESCRIPTION OF DRAWINGS

FIG. 2 is a fragmentary, cross-sectional view of the embodiment shown in FIG. 1, but with cam parts in disengaged position;

FIG. 3 is a fragmentary, developed view of the embodiment shown in FIG. 1 with the cam parts in engaged relation;

FIG. 4 is a fragmentary, developed view similar to FIG. 3, but with cam parts in disengaged position;

FIG. 5 is an enlarged, cross-sectional view taken along line 5—5 of FIG. 1; and

FIG. 6 is an enlarged, cross-sectional view taken along line 6—6 of FIG. 1.

BEST MODE FOR CARRYING OUT THE INVENTION

Figure 1:
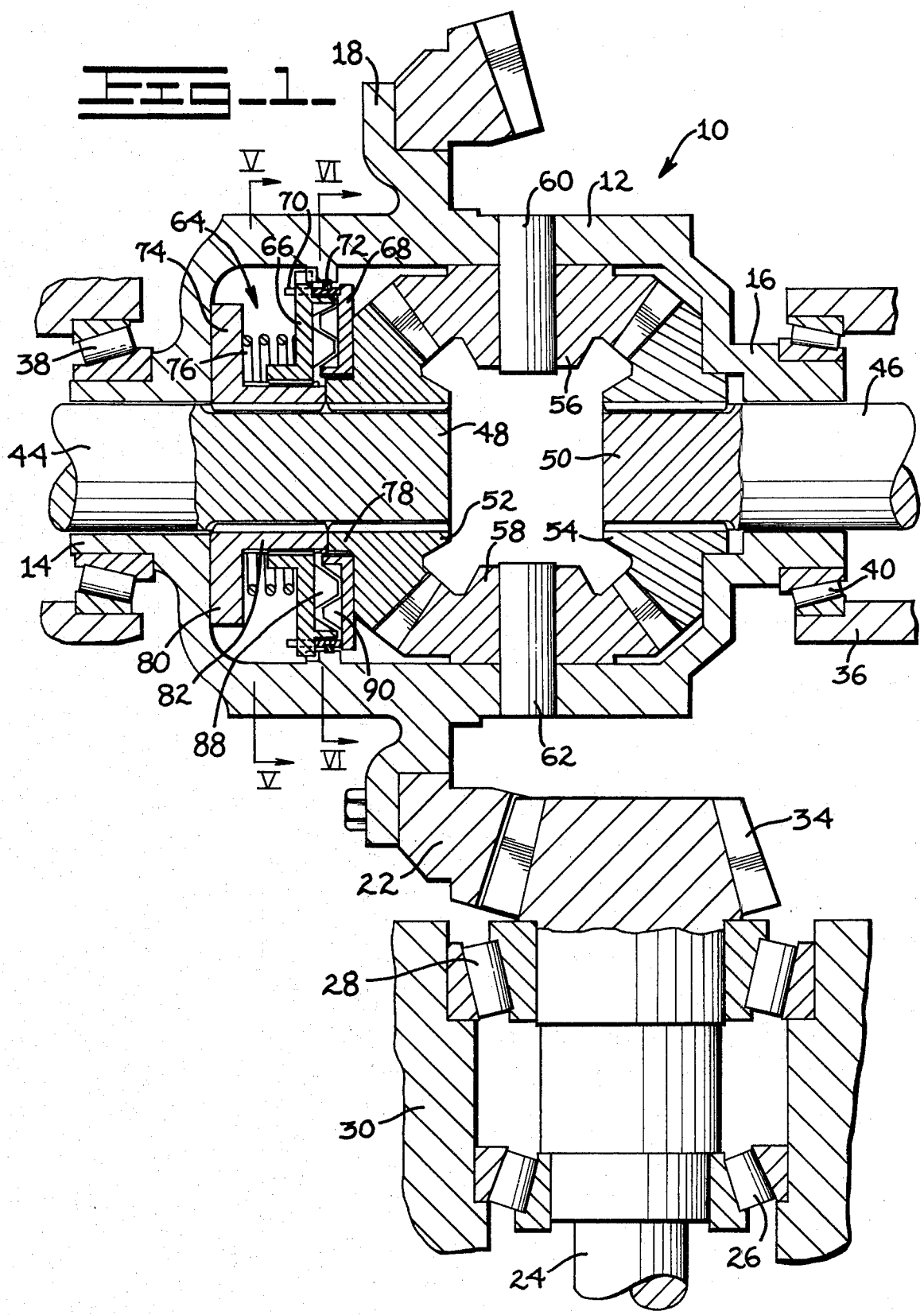
FIG. 1 is a cross-sectional view of an embodiment of the invention showing the internal configuration of the differential.

Referring to FIG. 1, a differential, generally designated 10, has a housing or carrier 12 defining hub portions 14 and 16 at each end thereof and an external annular flange 18 to which a driving ring gear 22 is suitably secured. A shaft 24, which is mounted by bearings 26 and 28 within a housing 30, carries a pinion 34 which is in driving engagement with the ring gear 22. During operation of a vehicle employing such a differential, rotation of the shaft 24 will effect rotation of the housing 12 through the gears 34 and 22.

The differential housing 12 is rotatably mounted within a housing 36 by respective bearing 38 and 40 positioned between the housing and the hub portions 14 and 16, respectively. Axles 44 and 46 rotatable on the axis of the differential housing 12 extend into the housing 12 through the hub portions 14 and 16, respectively. The respective inner ends 48 and 50 of the axles 44 and 46 are respectively splined or otherwise attached to side or axle gears 52 and 54. Engaging and interconnecting the axle gears 52 and 54 are differential compensating gears 56 and 58, which are rotatably supported by respective stub shafts 60 and 62 fixed relative to the housing 12. When a locking mechanism, generally designated 64, couples the cam ring 66 to the housing 12 to fix the axle 44 against rotation relative to the housing 12, rotation of the housing 12 will effect rotation of the axles 44 and 46 at the same velocity, since the differential gears 56 and 58 revolve with the housing, but do not rotate about the respective stub shafts 60 and 62.

The locking mechanism 64 includes a pair of cam rings 66 and 68, a lockout ring 70, a friction ring 72, a hub 74, and a biasing spring 76. The cam ring 68 is mounted on the splined outer hub portion 78 of the axle gear 52 so that it rotates along with the axle gear 52. Since the cam ring 68 is in contact with the rear surface of the axle gear 52, inward motion thereof is prevented. The hub 74 is mounted between the axle gear 52 and the differential hub portion 14. The hub 74 has an external flange portion 80 positioned against the differential hub portion 14 and an inwardly extending sleeve portion 82 which is splined to the axle 44. The hub sleeve portion 82 (refer to FIG. 5) also has external axial splines 84 which loosely mesh with the internal axial splines 85 of the cam ring 66, the hub 74 thereby providing a coupling between the cam ring 66 and the axle 44, which is broadly designated 86. The biasing spring 76 acts between the hub flange portion 80 and the cam ring 66 to urge the cam ring 66 axially into meshed engagement with the cam ring 68. The cam rings 66 and 68 have annular arrays of cam teeth 88 and 90 (refer to FIG. 6) which extend axially towards one another and cooperate in a manner which will be described hereafter.

Formed on the inner periphery of the differential housing 12 is an internal shoulder 92 (refer to FIG. 5) having spaced teeth 94 which define recessed sockets 96. Formed on the outer circumference of the cam ring 66 are radially extending teeth 98 which are adapted to seat in the sockets 96 to provide a releasable coupling between the housing 12 and the cam ring 66, which is broadly designated 99. The circumferential width of the teeth 98 is less than the circumferential width of the sockets 96 so that some backlash is present therebetween.

During normal operation, with the rotational velocity of the axles 44 and 46 being equal, the differential gears 56 and 58 will not rotate within the housing 12, but will revolve as a unit with the housing 12 about a longitudinal axis defined by the axles 46 and 48. Since the cam ring 66 is splined to the axle 44 through the splined connection of the hub 74 and is splined to the housing 12 through the teeth 98 and the sockets 96, the axle 44 will be locked relative to the differential housing 12. Thus, the rotational velocity and torque applied to each of the axles 44 and 46 will be the same.

When the rotational velocity of the axles 44 and 46 are unequal, the force applied to the respective tapered surfaces 100 and 102 (refer to FIG. 2) on the teeth 88 and 90 of the cam rings will cause the cam ring 66 to overcome the force of the spring 76 and move axially outward away from the cam ring 68 as seen in FIGS. 2 and 4. This axial movement of the cam ring 66 will effect disengagement of the teeth 98 from the internal shoulder 92 of the differential housing 12. After the tapered teeth are disengaged, the axles 44 and 46 are permitted to rotate at different velocities. At this point, the lockout ring 70 and the friction ring 72 are operative.

Rotation of the friction ring 72 by the housing 12 will rotate the lockout ring 70 to hold the cam rings 66 and 68 apart to prevent ratcheting of the tapered teeth 88 and 90 as seen in FIG. 4. The lockout ring 70 defines an axially extending shoulder 106 which extends through a circumferential groove 108 defined in the cam ring 66. As seen in FIG. 3, when the axles 44 and 46 are under equal torque force, the shoulder member 106 is centered within the groove 108. However, as shown in FIG. 4, when the cam rings 66 and 68 move apart and the friction ring 72 rotates the lockout ring 70, the shoulder member 106 will move into engagement with the side wall of the groove 108 and be positioned on abutment 110. In this position, the cam rings 66 and 68 will be held apart as best seen in FIG. 4. When the axles 44 and 46 once again turn with equal speed, a torque reversal will rotate the lockout ring 70 to allow it to move off of the shoulder abutment 110 and permit the cam ring 66 to move axially due to the force from the spring 76 and effect reengagement of the cam teeth 88 and 90.

For unlocking to occur, a loose fit is maintained between the splines 84 and 85 connecting the cam ring 66 to the axle 44 and between the teeth 98 and the sockets 96 to provide sufficient backlash. This backlash can best be seen by referring to FIG. 5, where clearance spaces are visible between the various components. Herein, larger backlash exists between the piloting splines 84 and 85 than between the straight-sided outer teeth 98 of the cam 66 and the sockets 96 defined in the housing shoulder 92.

INDUSTRIAL APPLICABILITY

During straight ahead operation of the vehicle, differential action is prevented so that the rotational velocity of the axles 44 and 46 are equal. The difference in axle torques which will cause the differential housing 12 to be unlocked may be adjusted by altering the preload force generated by the biasing spring 76.

If the difference in axle torques, which is a function of wheel-to-ground tractive effort, causes sufficient separating force on the tapered cam teeth to overcome the spring preload force, the straight-sided outer teeth 98 are disengaged from the housing 12. The lockout ring 70 will maintain disengagement so that the rotational velocities of axles 44 and 46 may differ. During this standard differential action, axle torques will be equal and at a magnitude corresponding to the amount that can be transmitted to the ground by whichever wheel has the lesser tractive effort. The lockout mechanism will allow the cams to reengage whenever axle rotation speeds again become equal.

During a turn, the impending speed difference between the axles 44 and 46 will cause a sufficient difference in axle torques to disengage the cam 66 from the housing 12 so that differential action can occur. When the turn is completed and axle speeds again become equal, the cam 66 will reengage the housing 12 to effect functioning of the differential 10 as a solid axle.

Thus, the present concept of the unlocking differential disclosed herein combines a solid axle feature such as that provided by an overrunning clutch with unlimited torque biasing and such as that produced by a torque proportioning differential during straight ahead operation. The differential disclosed herein reverts to a standard differential to provide equal torque forces to each axle during a turn so as to eliminate steering resistance and forced inner wheel spin.

The differential herein described may find particular applicability in heavy machinery, such as off-highway vehicles and earthmoving equipment.

Other aspects, objects and advantages of this invention can be obtained from a study of the drawings, disclosure and the appended claims.

What is claimed is:

1. In a differential (10) having a housing (12) rotated by a drive shaft (24), a pair of axles (44,46) driven by the differential extending along the rotational axis of the housing and having respective inner ends (48,50) within the housing, differential gears (56,58) rotatably supported by the housing and drivingly connecting together the housing and the inner ends of the axles, a locking mechanism comprising:

a pair of axially opposed cams (66,68) carried by one of the axles (44) and rotating therewith, one of said cams (66) being axially movable between operative and inoperative positions;

means (76) biasing said one cam (66) toward operative position in meshed engagement with the other cam (68);

locking means (98) associated with said one cam (66) and engaging cooperating means (96) carried by the housing when said cams (66,68) are engaged, said one cam (66) providing rotational backlash between the housing and said one axle (44) so that interaction of said cams (66,68) during differential rotation of said cams (66,68) moves said one cam

(66) axially out of engagement with the housing; and lockout means (70) for maintaining said cams (66,68) in spaced disengaged relation during differential rotation of the axles (44,46).

2. In a differential (10) having a housing (12) rotated by a drive shaft (24); a pair of axles (44,46) driven by the differential extending along the rotational axis of the housing and having respective inner ends (48,50) within the housing and differential gears (56,58) rotatably supported by the housing and drivingly connecting together the housing and the inner ends of the axles, a locking mechanism comprising:

a first cam ring (68) connected to one axle (44) for rotation therewith;

locking means (92) carried by the housing; and a second cam ring (66) adapted to cooperate with said first cam ring (68) and having first coupling means (86) for connecting said second cam ring (66) to said one axle (44) for rotation therewith and permitting axial movement therealong between a normally engaged position with said first cam ring (68) and a disengaged position, and second coupling means (99) for connecting said second cam ring (66) to said locking means (92) when said second cam ring (66) is at its engaged position to lock the housing and said one axle together, said second coupling (99) being disconnected from said locking means (92) when said second cam ring (66) is moved away from its engaged position, at least one of said coupling means (86,99) permitting rotational backlash between the housing and said one axle, whereby relative rotation between the housing and said one axle causes differential rotation of said cam rings (66,68) so that said second cam ring (66) is moved axially away from said first cam ring (68) to its disengaged position by the interaction of said cam rings (66,68) with each other.

3. The differential of claim 2 wherein said first and second cam rings (66,68) each have an annular array of tapered teeth (88,90) interfitting with the teeth of the other cam ring, said second cam ring (66) being axially movable along said one axle.

4. The differential of claim 3 further including spring means (76) for biasing said second cam ring (66) toward said first cam ring (68) and into meshed engagement therewith.

5. The differential of claim 2 wherein said second coupling means (99) includes first tooth and slot means (94,96) carried by said housing and second tooth and slot means (98) carried by said second cam ring (66) adjacent the radial edge thereof and adapted to cooperate with said first tooth and slot means (94,96), said second cam ring (66) being axially movable into engagement with said first tooth and slot means (94,96) when said second cam ring (66) is moved to its engaged position to lock said one axle (44) to the housing and out of engagement when said second cam ring (66) is moved to its disengaged position.

6. The differential of claim 2 further including a lockout ring (70) and a friction ring (72) between the housing and second locking ring (70) to rotate said lockout ring (70) along with said housing, said lockout ring (70) having means (106) for engaging said second cam ring (66) when said second cam ring (66) is at its disengaged position to maintain disengagement as long as differential rotation between said axles exists.

7. The differential of claim 8 wherein said lockout ring (70) resides between said cam rings (66,68) and has a shoulder portion (106) extending axially toward said second cam ring (66), said second cam ring (66) having a slot (108) of selected circumferential length for receiving said shoulder portion (106), when said cam rings (66,68) move apart, said shoulder portion (106), moving at least partially out of said slot (108) to span the space between said cam rings (66,68) to maintain a predetermined distance therebetween.

* * * * *